(12) United States Patent
Perneti et al.

(10) Patent No.: US 11,520,669 B2
(45) Date of Patent: *Dec. 6, 2022

(54) SYSTEM AND METHOD FOR EFFICIENT BACKUP SYSTEM AWARE DIRECT DATA MIGRATION BETWEEN CLOUD STORAGES

(71) Applicant: EMC IP Holding Company LLC, Hopkinton, MA (US)

(72) Inventors: Jayanth Kumar Reddy Perneti, Bangalore (IN); Rahul Deo Vishwakarma, Bangalore (IN); Kalyan C Gunda, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,275

(22) Filed: Apr. 28, 2021

(65) Prior Publication Data

US 2021/0248044 A1 Aug. 12, 2021

Related U.S. Application Data

(63) Continuation of application No. 16/653,675, filed on Oct. 15, 2019, now Pat. No. 11,023,332.

(51) Int. Cl.
*G06F 11/14* (2006.01)
*G06F 3/06* (2006.01)
*G06F 11/32* (2006.01)

(52) U.S. Cl.
CPC .......... *G06F 11/1464* (2013.01); *G06F 3/067* (2013.01); *G06F 3/0617* (2013.01); *G06F 3/0647* (2013.01); *G06F 11/1451* (2013.01); *G06F 11/1461* (2013.01); *G06F 11/1469* (2013.01); *G06F 11/324* (2013.01); *G06F 3/065* (2013.01); *G06F 11/1458* (2013.01)

(58) Field of Classification Search
CPC .. G06F 11/1464; G06F 11/1458; G06F 3/065; G06F 3/067
USPC ........................................................ 711/162
See application file for complete search history.

(56) References Cited

U.S. PATENT DOCUMENTS

| | | | | |
|---|---|---|---|---|
| 9,596,291 | B1* | 3/2017 | Basva | H04L 67/06 |
| 10,613,761 | B1* | 4/2020 | Zhao | H04L 67/1095 |
| 11,023,332 | B2* | 6/2021 | Perneti | G06F 11/1461 |
| 2012/0096059 | A1* | 4/2012 | Shimizu | G06F 3/0689 |
| | | | | 707/828 |
| 2014/0149476 | A1* | 5/2014 | Kishimoto | G06F 11/1451 |
| | | | | 707/827 |
| 2019/0034295 | A1* | 1/2019 | Bourgeois | G06F 16/353 |
| 2019/0042595 | A1* | 2/2019 | Basham | G06F 16/119 |

\* cited by examiner

*Primary Examiner* — Than Nguyen
(74) *Attorney, Agent, or Firm* — Staniford Tomita LLP

(57) ABSTRACT

A first cloud vendor is registered by a backup application. A file is moved from backup storage of the backup application to the first cloud vendor. A reference is maintained at the backup storage to the first file residing at the first cloud vendor. A second cloud vendor is registered by the backup application. The backup application directs a migration of the file from the first cloud vendor to the second cloud vendor without recalling the file to the backup storage. A reference maintained at the backup storage is updated to refer to the file now residing at the second cloud vendor. The updated reference is maintained at the backup storage.

15 Claims, 13 Drawing Sheets

Create Cloud Data-Management Rule                                                                    ✕

This creates a new Data Management rule to manage data between two cloud units controlled by Datadomain. Select required options for efficient data management

805

| RULE | SELECTION |

Name of the Rule:      [                    ] ← 810

Rule Selection:        [Include(Move data that match this rule) ▼] ← 815

Select Cloud Units ← 820

Select Source Cloud Unit:   [cloud_unit_1  ▼]

Select Target Cloud Unit:   [cloud_unit_2  ▼]

Operation ← 825

Select Data Management Operation to be Performed:

○ Copy (Copies data from source to target)
　　　　　　○ Move (Data from source, will be moved (deleted) and placed on the target)
　　　　　　○ Sync (Source is synced to target, changing target only)

Advanced Options:

Notifications ← 830

Raise alerts on the system:   [Enabled  ▼]

This raises alerts on the system on data-management operation status

Email Notification:           [Enabled  ▼]

Reciever Email Address: [              ]

Sends email notification of the data-management operation status with the report attached

[?]                                                          [ NEXT ] [CANCEL]
                                                         835 ─┘

SYSTEM AND METHOD FOR EFFICIENT BACKUP SYSTEM AWARE DIRECT DATA MIGRATION BETWEEN CLOUD STORAGES

CROSS-REFERENCE TO RELATED APPLICATIONS

This application is a continuation of U.S. patent application Ser. No. 16/653,675, filed Oct. 15, 2019, and is incorporated by reference for all purposes along with all other references cited in this application.

TECHNICAL FIELD

The present invention relates generally to information processing systems, and more particularly to making a backup system aware of data migrations between cloud storages.

BACKGROUND

Virtually all organizations have a backup system to protect against data loss. A backup system functions by storing backup copies of the organization's data. If, for example, a primary copy of data is lost such as via accidental deletion, hardware failure, or other disaster, the data can be recalled from the backup system. As the organization continues to grow and generate data, the costs to maintain the backup copies on the backup system likewise continues to grow.

Cloud storage from cloud providers can offer organizations economical solutions to their storage needs. Cloud providers make their resources available to many different organizations and each individual organization can benefit from economies of scale achieved from aggregating demand.

However, a problem with storing backups in various cloud storage is the decoupling of the backups from the backup system. This can frustrate attempts to recall those backups should the need arise. Therefore, there is a need for improved systems and techniques to facilitate backup system awareness with regard to cloud storage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 8 shows a screenshot of a GUI for creating a cloud data management rule, according to one or more embodiments.

FIG. 9 shows another screenshot of a GUI for creating a cloud data management rule, according to one or more embodiments.

DETAILED DESCRIPTION

Figure 1:
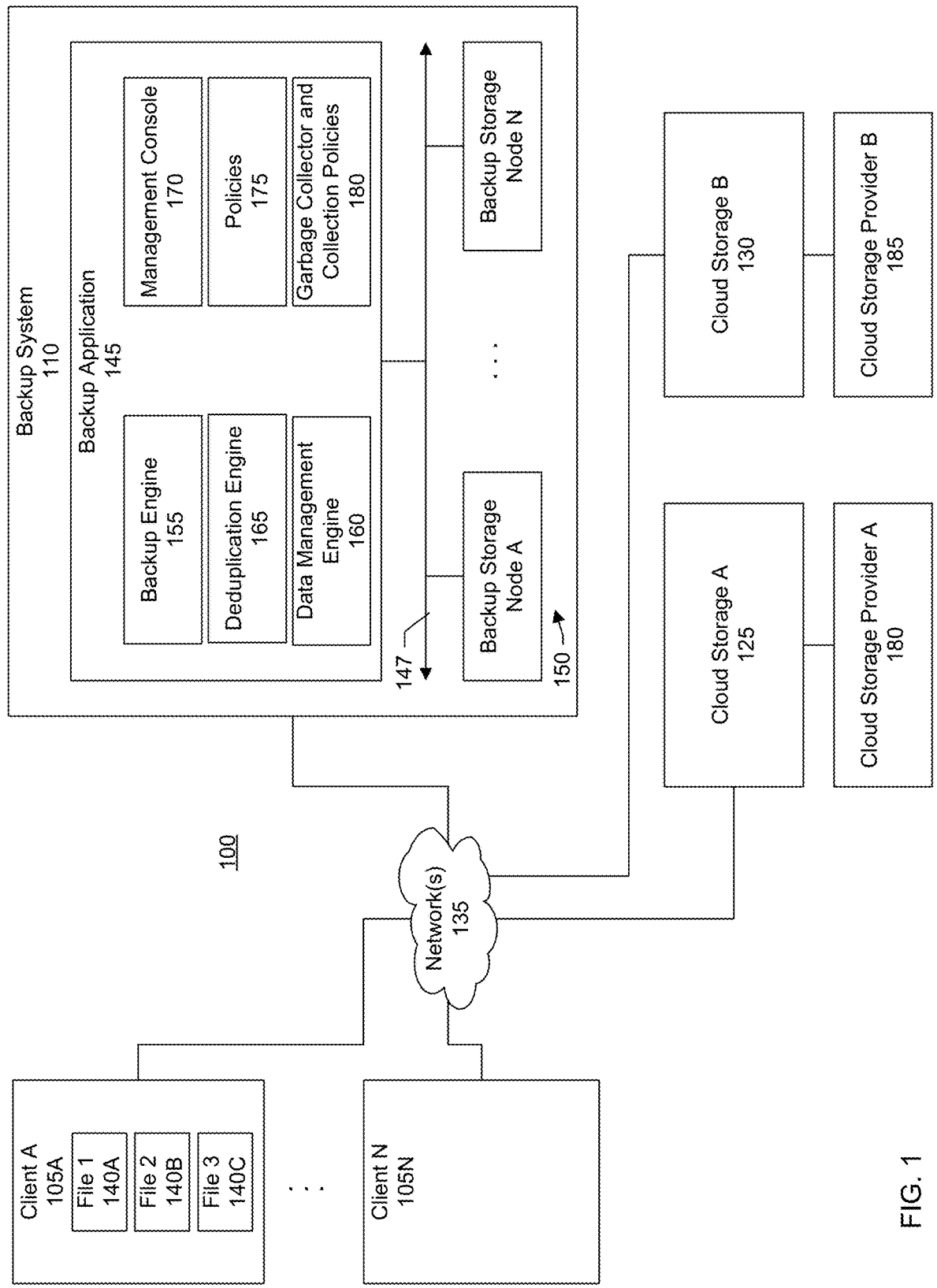
FIG. 1 shows a block diagram of an information processing system for backup system aware direct data migration between clouds, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

Disclosed herein are methods and systems for directly migrating data backed up to a cloud to another cloud while ensuring that a backup system or application is aware of the migration. This helps to ensure that the backup application, if requested, is able to recall the data to a client despite the data having been migrated to a different cloud. FIG. 1 shows a block diagram of an information processing system 100 within which such methods and systems may be implemented according to one or more embodiments. In the example shown in FIG. 1, there are a set of clients 105A-N, a backup system 110, a first cloud storage 125, and a second cloud storage 130. The clients, backup system, first cloud storage, and second cloud storage may be connected via a network 135. FIG. 1 shows two cloud storages. It should be appreciated, however, that there can be any number of cloud storages that may be tracked by the backup system.

The network provides a mechanism for allowing the various components of the information processing system to communicate with each other. The network may itself be comprised of many interconnected computer systems and communication links. Communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, the network is the Internet, in other embodiments, the network may be any suitable communication network including a local area network (LAN), a wide area network (WAN), a wireless network, an intranet, a private network, a public network, a switched network, and combinations of these, and the like.

The clients may be any type of computing device. Examples of computing devices include personal computers (e.g., desktops, laptops, tablets, smartphones, mobile phones, smartwatches, or wearable devices), servers, Web-enabled devices, or Internet of Things (IoT) devices and appliances. The clients generate data, files, or other data objects that may be referred to as primary data. For example, client 105A may generate first, second, and third files 140A-C.

To protect against data loss, an organization may backup the files from the clients to the backup system. The backup system provides a secondary storage system for the organization's data. An example of a backup system includes Data Domain as provided by Dell EMC of Hopkinton, Mass. Some embodiments are described in conjunction with the Data Domain backup system. It should be appreciated, however, that aspects and principles of the systems and techniques described can be applied to other backup systems.

The backup system may be an on-premises backup system of the organization. For example, backups may be stored in network attached storage of the organization. A client may include a client backup module that communicates with the backup system to backup client data to the backup system. The backup system can store the received data (e.g., files) as secondary or backup copies. If the primary copies at the clients become lost, such as via accidental deletion, or client hardware failure, the files can be recovered from the backup system. In some cases, backed up data may be moved from the backup server to cloud storage, such as first cloud storage. Moving backups to cloud storage can lower overall storage costs based on economies of scale that may be available with cloud storage.

The backup system represents any type of server or cluster of servers. In the example shown in FIG. 1, the backup system includes a backup application 145 and one or more backup storage nodes 150 connected to the backup application via an interconnect 147. The interconnect may include a bus architecture, network, or any other connection scheme that can link backup storage to the backup application. The backup application includes several components including a backup engine 155, data management engine 160, deduplication engine 165, management console 170, policies 175, and garbage collector 180. It should be appreciated that the blocks shown in FIG. 1 may be functional and there can be many different hardware and software configurations to implement the functions described.

The backup engine is responsible for communicating with the various clients to backup data from the clients to the backup system (and recover the backup data to the clients upon request). The deduplication engine is responsible for data deduplication. Deduplication allows for efficient storage of the backed up data. In a specific embodiment, a file or other data object to be backed up is segmented. Fingerprints or hashes are calculated for the segments. The fingerprints may be compared against a fingerprint or deduplication index identifying segments already existing at the backup system. A matching fingerprint indicates that the corresponding data segment already exists at the backup system. In this case, rather than transmitting the segment from the client to backup server, a reference to the segment can be created and maintained at the backup server so that the file can be reconstructed. A non-matching fingerprint indicates that the corresponding segment does not exist at the backup server and therefore should be transmitted to the backup server.

Backups may further include compression operations to reduce the traffic over the network, encryption operations to secure the data, or both. Backups (e.g., secondary copies) may be stored in a format (e.g., compressed format or deduplicated format) that is different from a native format of the primary copies at the clients.

The policies specify one or more rules defining data management operations or actions to be performed between the first and second cloud storages, and one or more conditions to satisfy in order to trigger the data management operations. Examples of data management operations include copying backup data from the first cloud storage to the second cloud storage, moving backup data from the first cloud storage to the second cloud storage, or synchronizing backup data between the first cloud storage and the second cloud storage. Conditions may be based on parameters such as file age, file size, or both. Rules can be inclusive (e.g., move data that matches this rule) or exclusive (e.g., move data that does not match this rule). The policies can be user-definable such as via a backup administrator of an organization.

The data management engine is responsible for the overall management of the backed up data. Some of the data management tasks that the data management engine may perform or facilitate include configuring and connecting the cloud storages to the backup system, evaluating the policies to determine whether a data management operation should be performed, initiating and orchestrating the data management operation based on the policy evaluation, validating that the data management operation was successful, tracking the location of the backed up data (e.g., updating a backup catalog or other metadata indicating past and current location of a file that was originally backed up to the backup server), recalling the backed up data if requested, transmitting alerts or other notifications to the user about the status of a data management operation, managing retention periods, or combinations of these.

The management console is a user interface to the backup system. The user interface may be a graphical user interface (GUI) or command line (CL) interface. In an embodiment, another application may interface with the backup system through an application programming interface (API) exposed by the backup system. In a specific embodiment, the user (e.g., backup administrator of the organization) uses the management console to define the data management policies, specify the data management operations, specify and identify backup data subject to the data management operations, review calculated time estimates for completing the data management operations, prioritize data for the data management operations, configure alerts and notifications, identify and register the cloud storages for connection to the backup system, view a lifecycle of a file on the backup system (e.g., view times and dates when a file was backed up from a client to the backup server, migrated from the backup server to the first cloud storage, and migrated from the first cloud storage to the second cloud storage), view listings of files presently residing at the backup server, view listings of files presently residing at the first cloud storage, view listings of files presently residing at the second cloud storage, or combinations of these.

The backup storage nodes may be assigned into different tiers. Different tiers may have different types of storage. For example, recently backed up data may be placed in first tier having high performance storage devices (e.g., solid state drives (SSDs)) as recently backed up data may be more likely to be accessed as compared to older backups. As backups age or frequency of access decreases, the backups may be transferred from the first tier to a second tier having lower performance, but less expensive storage devices (e.g., hard disk drives (HDDs)).

In a specific embodiment, there is an active tier and a cloud tier. In this specific embodiment, the active tier includes the actual physical backups or secondary copies. In this specific embodiment, initial backups from the clients are stored in the active tier. As these backups or secondary copies age, the backups may be moved to cloud storage. In this specific embodiment, the cloud tier includes metadata having references to secondary copies that have been moved from the active tier to cloud storage. In a specific embodiment, moving files from an active tier to a cloud tier refers to moving the files from the active tier to a cloud storage. In this specific embodiment, files in the cloud storage may thus be referred to as files having been moved to the cloud tier.

The garbage collector is responsible for reclaiming backup storage space at the backup storage nodes. In an embodiment, when a file in the active tier is moved to the cloud tier (e.g., moved out of the backup system and to cloud storage), the file in the active tier is marked for deletion. Garbage collection policies can specify a periodic cleaning schedule during which the garbage collector runs a cleaning operation. The cleaning operation may include enumerating the files in the file system of the backup system to identify files marked for deletion. Since a garbage collection can consume a significant amount of resources, the garbage collection policies allow the user to specify the conditions (e.g., times) when garbage collection may be run.

In a specific embodiment, the backup system maintains a namespace that is global across the active and cloud tiers. In this specific embodiment, the active and cloud tiers do not have their own separate namespaces. The global namespace facilitates tracking and recall of backed up files even when one or more of the files have been moved from the active tier to the cloud tier (e.g., moved out of the backup system to cloud storage) or moved directly from one cloud storage to another cloud storage.

The cloud storage is provided by a cloud storage provider. In the example shown in FIG. 1, the first cloud storage is provided by a first cloud storage provider 180. The second cloud storage is provided by a second cloud storage provider 185.

In a specific embodiment, the cloud storage provider is an entity different from the organization, vendor of the backup system, or both. For example, the cloud storage provider may provide a public cloud. Some examples of cloud storage providers or public clouds include Amazon Web Services® (AWS Cloud) as provided by Amazon, Inc. of Seattle, Wash.; Microsoft Azure® as provided by Microsoft Corporation of Redmond, Wash.; Google Cloud® as provided Alphabet, Inc. of Mountain View, Calif.; and others. The cloud storage provider makes resources available as services to its tenants over the network (e.g., internet). The cloud storage provider, however, is responsible for the underlying infrastructure. For example, Amazon Simple Storage Service (S3) provides storage for customer data in object storage. Data, such as files, may be stored as objects in logical containers referred to as buckets.

In a specific embodiment, the first and second cloud storages are provided by different cloud storage providers. For example, the first cloud storage may be an AWS Cloud. The second cloud storage may be Microsoft Azure. In another specific embodiment, the first and second cloud storages may be provided by the same entity (e.g., Amazon Web Services). For example, the first cloud storage may be associated with, correspond to, or represent a first logical container. The second cloud storage may be associated with, correspond to, or represent a second logical container, different from the first logical container. The first logical container may be provided by a first cloud storage provider. The second logical container may be provided by a second cloud storage provider, different from the first cloud storage provider. Alternatively, the first and second logical containers may be provided by the same cloud storage provider.

With the geometric explosion of data, the data stored in a backup system is growing at an exponential scale. Consequently, customers have a desire to move infrequently accessed data to cloud storage for long-term retention (LTR) using their respective backup applications. Cloud storage can help to lower an organization's data storage costs due to efficiencies of scale that may be available with cloud storage.

Once a customer or organization has moved their data to cloud storage, however, the customer may need to address the following scenarios below:

1) What if a cloud service provider plans to cease operations (e.g., proceed to end-of-life (EOL)). How will customers will handle petabytes or even exabytes of data migration? What are cost efficient ways?

2) Customers may desire to leverage heterogeneous cloud service providers using their backup application. It would be desirable to have a flexibility to move the data across different cloud providers without recalling the data back to the backup system and then moving to a different cloud provider. That is, it is desirable to move backup data from the first cloud storage to the second cloud storage, without having to first recall the backup data from the first cloud storage to the backup system and then transmit the backup data from the backup system to the second cloud storage.

There are many reasons why a customer might like to move data from one cloud to another. Examples of such reasons include new terms and conditions, contract renewal, long term cost benefits, corporate offers, compliance standards, simplicity of data consolidation, and many others.

In a specific embodiment, systems and techniques are provided that allow a customer or organization to perform a "direct controlled data-migration" between multiple clouds triggered from the backup system. In a specific embodiment, based on a customer service level agreement (SLA), migration of data from an existing cloud (which may be proceeding to end-of-life) is provided as an enhanced feature of the backup system. In this specific embodiment, systems and techniques provide an option to the customers to prioritize the data to be migrated which allows them to have a feel of continuous data access.

In a specific embodiment, there is a backup system that acts like a "central control plane" for orchestrating data movement across heterogeneous cloud service providers, without any third-party utility tools. In today's market, there is a need to provide customers with simplified complete integrated solutions that allow for complete and easy management of the lifecycle of data.

In a specific embodiment, a data management engine of the backup application or system performs user specified data-management operations such as copy, move, and synchronize (sync) between clouds.

Table A below shows a flow for direct cloud data migration from the backup system according to one or more embodiments.

TABLE A

| Step | Description |
|---|---|
| 1 | Customer organizations specify the SLA, source and target cloud units for performing data-management operations (e.g., migrate, copy, or synchronize) between clouds. |
| 2 | A prediction algorithm calculates an estimated time for the data migration (or data management operation). If the estimated time for data-migration (based on the prediction algorithm) exceeds the customer specified SLA, then the data is prioritized for data-migration based on the options below that may be selected by the user.<br>A first option may be a manual prioritization. In the manual option, the end user prioritizes the data (manual intervention needed) or chooses the data or files to migrate first (e.g., most critical data).<br>A second option may be an automatic prioritization. In the automatic option, the data management engine automatically prioritizes the data based on one or more different criteria such as data access pattern, file size, and data retention requirements, or combinations of these. |
| 3 | Once the data (e.g., files) to migrate have been identified, and prioritized if necessary, the data management engine starts the direct data migration (without recalling to active tier) between clouds. |
| 4 | Once the migration operation is done, data-management engine performs a validation on the data that is migrated to target cloud to ensure there is no data corruption. |
| 5 | Backup system updates its metadata information. |
| 6 | Notifications sent to the end user. |

In a specific embodiment, systems and techniques are provided for efficient backup system aware direct data-migration between cloud providers. In this specific embodiment, a direct-controlled cloud data migration from the backup system is performed. In a specific embodiment, the backup system acts as a central control plane and provides a complete integrated solution without leveraging any third-party utility. Systems and techniques provide for a cloud to cloud movement from a central control plane of the backup system; and automatic prioritization of data to be migrated from one cloud vendor to another cloud vendor.

In a specific embodiment, the data management engine provides a central control plane and performs one or more of registering different cloud service providers; performs data migration between different cloud vendors, without recalling cloud data to the active tier; validates cloud data migration operation; updating the metadata information of the backup system; and notifying of a successful or unsuccessful completion of operation to the user.

In a specific embodiment, the data management engine provides a central control plane and performs one or more of a data migration operation from one cloud vendor to another based on a schedule defined by the user (data operations may include copy, migrate and synchronize); computes the estimated time for completion of operation based on a prediction mechanism (e.g., regression-based model on historical data); before beginning the operation, displays to the user the estimated time and provides two methods or options to perform the operation, e.g., manual or autonomous; for the manual operation, allows the user to choose and prioritize the most critical data; for the autonomous operation, based on various features of cloud data, e.g., data file size, access pattern and retention requirements automatically generates a priority order for the migration and provides a feel of continuous data access to end user; and an updating of the metadata information of the backup system.

Figure 2:
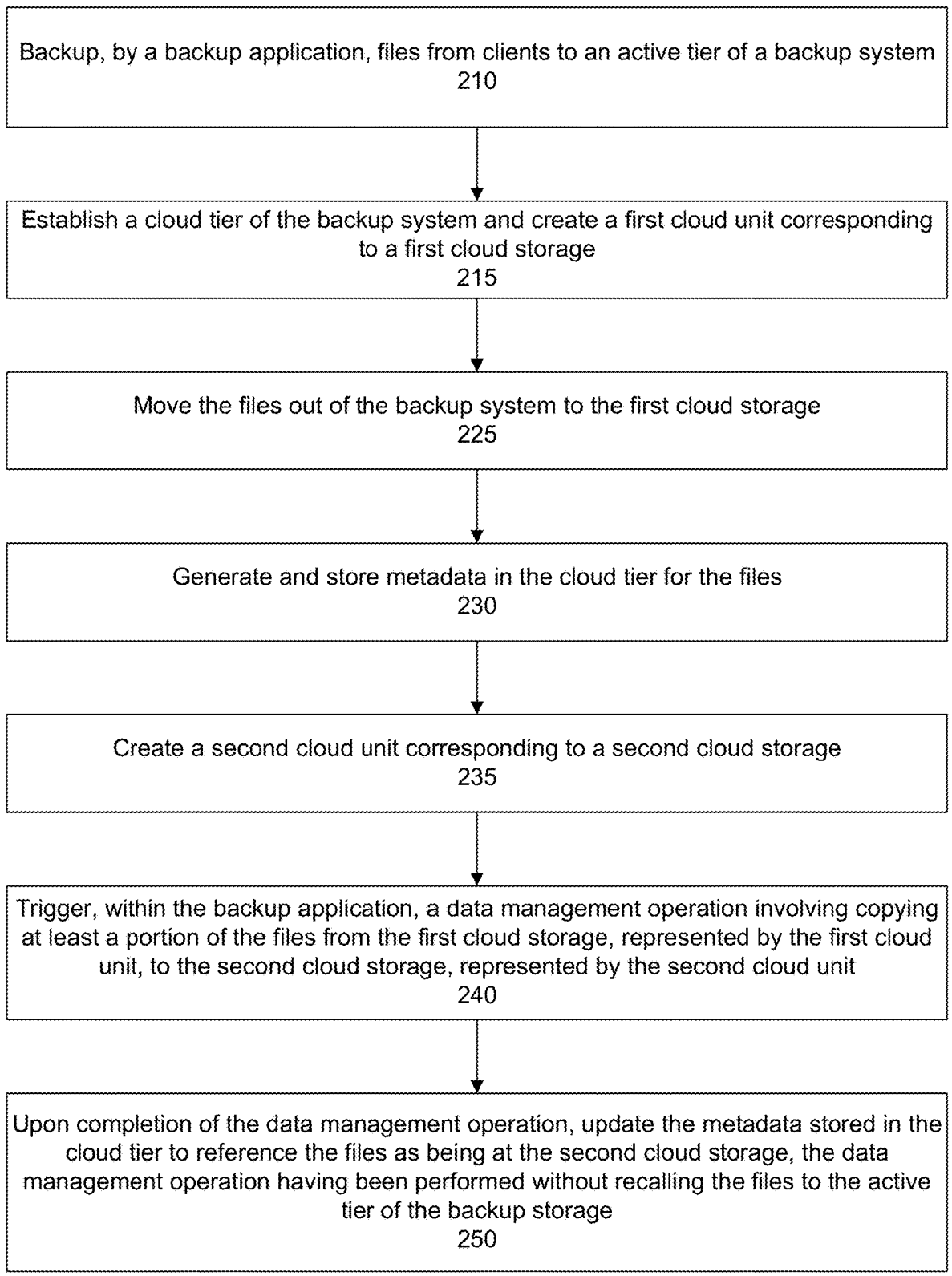
FIG. 2 shows an overall flow of a process for direct data migration between clouds with backup system awareness, according to one or more embodiments.

FIG. 2 shows an overall flow for a backup system aware direct data-migration between cloud providers, according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

Figure 3:
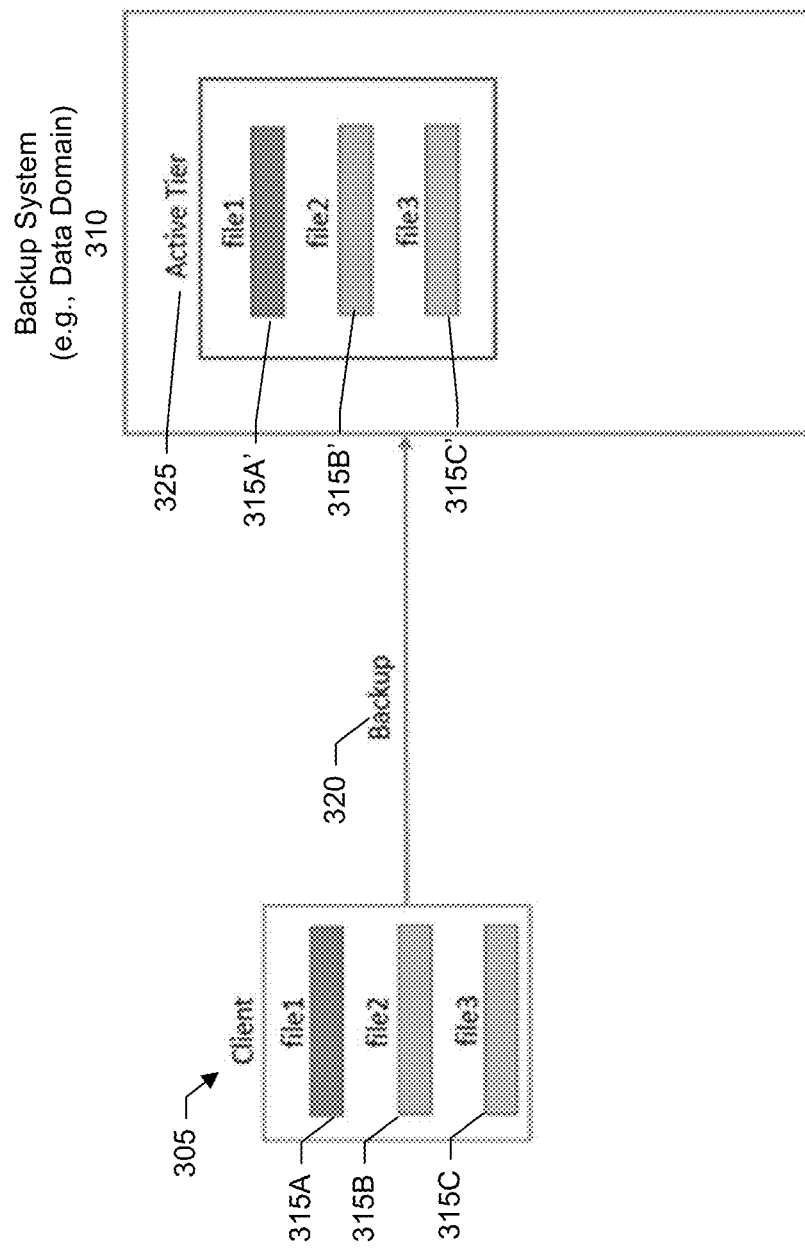
FIG. 3 shows a block diagram of backing up a file from a client to a backup system, according to one or more embodiments.

In a step 210, a backup application of a backup system performs a backup of client data to an active tier of a backup system. FIG. 3 shows a block diagram of a client backup to the backup system. As shown in the example of FIG. 3, there is a client 305 and a backup system 310 (e.g., Data Domain). The client includes first, second, and third files 315A-C. The files are backed up 320 to the backup system and stored in an active tier 325 of the backup system. In other words, secondary copies 315A'-315C' of the files are stored at the backup system. The client backups may be performed by a backup administrator of an organization as part of a regular schedule of backups to the backup storage system to ensure the data remains properly protected and can be reliably recovered.

Referring back now to FIG. 2, in a step 215, a cloud tier of the backup system is established and a first cloud unit corresponding to a first cloud storage is created. In a specific embodiment, establishing the cloud tier includes obtaining or licensing a separate appliance or shelf unit provided by a vendor of the backup system and connecting the appliance to the backup system. The cloud tier appliance includes certain hardware, software, modules, programs, processors, storage devices or disk types, and memory suitable for storing data in cloud storage. Providing the cloud tier as a separate appliance helps to enhance the flexibility of the backup system. For example, customer organizations that do not have a need to migrate secondary copies of data from the backup system to cloud storage do not have to purchase the cloud tier appliance.

The cloud tier appliance includes a user interface through which the customer organization user can create a cloud unit. In a specific embodiment, the cloud unit is a logical extension to a file system of the backup system. In a specific embodiment, the cloud unit is a connector to an object storage provider (e.g., S3 or simple storage service). The cloud unit may represent a logical storage container of the cloud storage provider (e.g., AWS bucket). In a specific embodiment, the cloud tier application includes a cloud unit creation module that interfaces with the various application programming interfaces (APIs) that may be exposed by the different cloud storage providers (e.g., S3 REST API).

The cloud unit creation module may, for example, connect to the AWS interface and generate and send commands through the API to create an Amazon S3 bucket in an AWS account associated with the customer user. Creating the cloud unit may include, for example, receiving the customer user's AWS account credentials (e.g., username and password) and transmitting the AWS account credentials to AWS in order to create the S3 bucket in the customer user's AWS account. The cloud unit creation module registers the S3 bucket as a cloud unit (e.g., first cloud unit) and assigns the cloud unit a unique identifier. The identifier assigned to the cloud unit may be based on an object or container identifier generated by the cloud provider and another identifier generated by the cloud unit creation module.

In a specific embodiment, the cloud tier stores metadata referencing the files (e.g., data objects) that have been moved from the backup system to cloud storage. The metadata may include, for example, times and dates indicating when the files were moved, file names, file sizes, name of the cloud storage provider (e.g., Amazon AWS, Microsoft Azure, or Google Cloud), other metadata, or combinations of these.

In a step 225, backed up files are moved from the backup storage system to first cloud storage represented by the first cloud unit. For example, the data management engine of the backup system may issue a PUT command to the first cloud to place a copy of a backed up file into the first cloud. Once the backup system receives an indication from the first cloud that the file was successfully received, the backup system may mark the file in the active tier for deletion, update metadata in the cloud tier to point to the file now residing at the first cloud, and include a reference in the active tier to the metadata in the cloud tier (which in turn points to the file now residing at the first cloud).

As discussed, in many cases, there may be a need to retain at least some of that backup data for an extended period for governance or compliance purposes. For data that requires long term retention, the costs incurred with continuing to store on an active protection storage tier may outweigh the benefits as the backups are likely to be accessed only under special circumstances. Thus, customers may realize cost savings by moving this data to cloud storage for long-term retention and cost savings. The backup system can be configured to connect to cloud storage and perform the data movement.

In a specific embodiment, the data movement operation is automatically triggered by a data movement policy. In this specific embodiment, the data movement policy can specify one or more criteria or conditions for when backup data should be moved from the backup system to cloud storage. The conditions may include business unit of the organization that owns the file, file age or time that the file has remained in the active tier of the backup system, date the file was last recalled from the backup system to a client, other conditions, or combinations of these. Alternatively, the data movement operation may triggered on-demand, such as via a request from the user.

In a step 230, metadata for files moved to the cloud tier (or more specifically, the first cloud storage) is generated and stored. The metadata allows the backup system to track the location of the files and recall the files upon request.

Table B below shows an example of metadata that may be stored in the cloud tier of the backup system.

TABLE B

| Filename | Cloud Location | Cloud Account Detail | Placement Time | File (e.g., object) ID |
|---|---|---|---|---|
| File 2 | Cloud Unit 1 ID | Cloud Unit 1 username/password | Oct. 7, 2019 | 2157410413 |
| ... | ... | ... | ... | ... |

A first column of the table is labeled "Filename" and lists the filename for the file. The filename may be a user-generated filename. A second column of the table is labeled "Cloud Location" and identifies the cloud storage at which the file resides. A third column of the table is labeled "Cloud Account Detail" and stores the user's cloud account credentials. This allows the backup system to access the cloud account of the customer user. A fourth column of the table is labeled "Placement Time" and stores a timestamp indicating when the file was placed (e.g., PUT) into the cloud storage. A fifth column of the table is labeled "File (e.g., object) ID" and stores an identifier for the file. The file identifier may be an object ID generated by the cloud provider and returned to the backup system upon the file being placed into the cloud storage.

Figure 4:
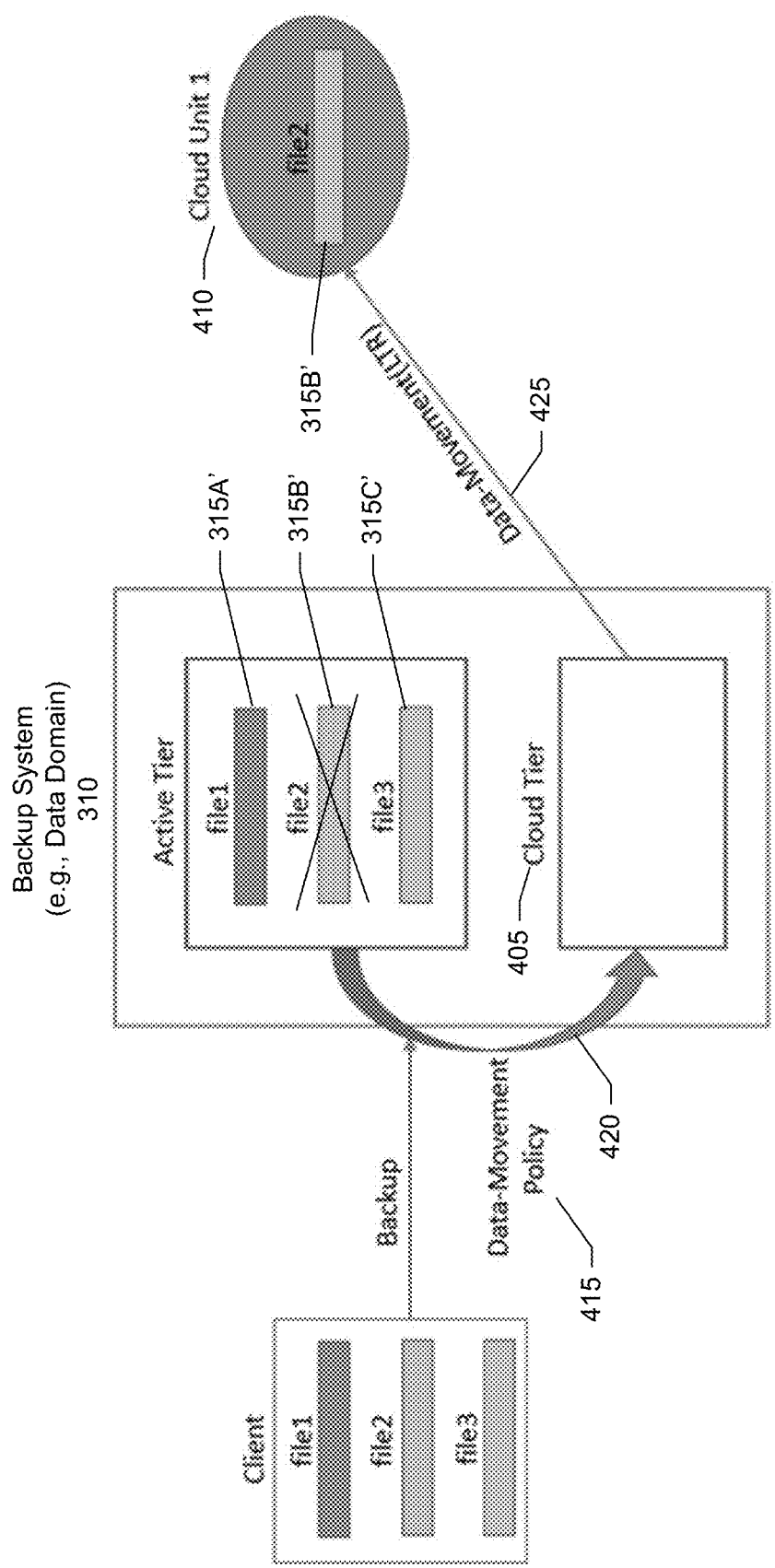
FIG. 4 shows a block diagram of migrating the file from the backup system to a first cloud unit representing a first cloud storage, according to one or more embodiments.

FIG. 4 shows a block diagram for performing a data movement of the data backed up in FIG. 3 to cloud storage for long-term retention (LTR). As shown in the example of FIG. 4, a cloud tier 405 of the backup system has been established and a first cloud unit 410 has been created. FIG. 4 shows a data movement policy 415 having been triggered to cause moving 420 file 315B" from the active tier to the cloud tier which in turn results in a data movement 425 of file 315B" to the first cloud unit (or more particularly, a first cloud storage represented by the first cloud unit). In FIG. 4, an "X" has been superimposed over file 315B' in the backup system to indicate that file 315B' has been moved out of the backup system.

In a specific embodiment, the data movement operation includes creating and storing a reference in the cloud tier that references file 315B" now being stored at the first cloud storage. The data movement operation may further include creating and storing a reference in the active tier to replace file 315B" and point to the reference in the cloud tier which, in turn, points to the first cloud unit where file 315B" now resides. These references allow the backup system to track the location of file 315B" and recall the file upon request. For example, to recall the file, the data management engine may review the metadata maintained in the cloud tier to identify a location of the file to recall and issue a GET command to the cloud where the file resides. The GET command may be accompanied by an identifier (e.g., object ID) that identifies the file to be retrieved.

As discussed, in a specific embodiment, the backup system includes an active tier which is the default storage/tier established when the file system is initially created. The backup system can support additional or alternative tiers to facilitate long term retention. In a specific embodiment, a cloud tier allows object storage from a supported cloud provider to be added to the backup system for long term retention of a subset of data in the cloud. In a specific embodiment, locally attached storage is added to the backup system to form or establish a cloud tier of the backup system. The cloud tier stores metadata for files that have been moved out of the backup system and to an alternate tier such as cloud storage. The cloud tier does not hold the actual data of the files, but instead stores metadata describing the data on object storage of the cloud storage.

Any new data backed up from the clients and sent to the backup system is initially written to the active tier. Once an alternate tier is established, a data movement policy may be configured to periodically migrate backed up data located in certain directories (e.g., mtrees) or satisfying certain criteria out of the active tier. For example, the data movement policy may specify that files older than 90 days are to be migrated out of the active tier.

More particularly, periodically, a data movement process starts which looks for files in directories (e.g., mtrees) with a data movement policy set where: 1) the file is on the active tier and 2) the modification time (mtime) of the file is sufficiently old such that (current time−mtime)>data movement policy, i.e., a current time minus a modification time is greater than a threshold duration as specified in a data movement policy.

Such files are identified as "candidates" for migration and are copied out to the alternate tier of storage. In a specific embodiment, the copy operation is de-dupe aware so only physical data which is not already on this alternate tier (e.g., physically residing at a cloud storage) is actually copied. In this specific embodiment, once the copy of a file is complete it is "installed" in the alternate tier of storage meaning that it now physically exists on that tier of storage and not the active tier.

The next time the garbage collector is run on the active tier for cleaning, space which was being used by files which have been migrated can be reclaimed. In a specific embodiment, a garbage collection policy is configured by default to run garbage collection once a week. A user can configure the garbage collection policy to run garbage collection at any desired frequency.

In a specific embodiment, the data movement is completely transparent to the backup application and users. For example, when listing the contents of a directory all files may still be shown regardless of the tier in which they physically exist. In this specific embodiment, the file system of the backup system maintains a single namespace across tiers. Having a single namespace facilitates a good user experience because the user is provided with a single or seamless interface through which they can view all backed up files—regardless of whether a file exists on the backup system (e.g., is on an active tier of the backup system) or has been migrated out of the backup system and to cloud storage. For example, when the user issues a request to the backup system to display a list of files that have been backed up, the backup system may return a file listing that includes files currently residing in the backup system, files currently residing outside the backup system and at a first cloud, files currently residing outside the backup system and at a second cloud, or combinations of these.

When, however, the user attempts to read the data (e.g., attempts to read a file migrated out of the backup system and to cloud storage), the file is recalled back from the cloud storage to the active tier of the backup system as reading directly from object storage can cause an I/O error. Recalling the file back to the active tier may be referred to as a reverse copy. Systems and techniques provide for a backup application (or backup system) that is "long term retention/cloud aware." This allows for successfully restoring files through the backup application or backup system even though the files may be on object storage outside of the backup system.

Referring back now to FIG. 2, in a step 235 a second cloud unit is created corresponding to a second cloud storage. The second cloud storage may be at a cloud provider different from a cloud provider of the first cloud storage. The process to create the second cloud unit is similar to the process to create the first cloud unit. For example, the cloud unit creation module of the backup system may connect to the Microsoft Azure interface (e.g., Azure API) and generate and second commands through the API to create an Azure Blob logical storage container in an Azure account associated with the customer user.

Creating the cloud unit may include, for example, receiving the customer user's Azure account credentials (e.g., username and password) and transmitting the Azure account credentials to Azure in order to create the Azure storage container in the customer user's Azure account. The cloud unit creation module of the backup system registers the Azure storage container as a cloud unit (e.g., second cloud unit) and assigns the second cloud unit a unique identifier.

In a step 240, a data management operation is triggered within the backup application, where the data management operation involves copying at least a portion of the files from the first cloud storage, represented by the first cloud unit, to the second cloud storage represented by the second cloud unit. The data management operation, as specified by the user, may be a move/migrate operation, a copy operation, or a synchronize (snyc) operation.

In a specific embodiment, a move/migrate operation involves copying a file from the first cloud unit (e.g., source cloud unit) to the second cloud unit (e.g., target cloud unit) and deleting the file from the first cloud unit upon verification that the file has been successfully copied to the second cloud unit. The copy operation involves copying the file from the first cloud unit (e.g., source cloud unit) to the second cloud unit (e.g., target cloud unit) and maintaining both files at their respective cloud units. The sync operation involves copying any new portions of the file from the first cloud unit (e.g., source cloud unit) to the second cloud unit (e.g., target cloud unit) and maintaining both files at their respective cloud units. The new portions of the file include portions of the file not found at the target cloud unit. In a specific embodiment, deduplication services (e.g., deduplication microservices) of the backup system may be deployed or provisioned at the source and target cloud units. During a sync operation, the deduplication services help to ensure the efficient transfer of only new data segments of a file from the source cloud unit to the target cloud unit.

In a step 250, upon verification that the data management operation has completed, the metadata stored in the cloud tier of the backup system is updated to reflect the changes at the first and second cloud units. For example, for the move/migrate operation, the metadata at the cloud tier is updated with a reference to the file now residing at the second cloud unit. As discussed, the data management operation (e.g., move/migrate operation, copy operation, and synch operation) is performed without recalling data from the first cloud unit to the active tier of the backup system. Instead, the data is transmitted directly from the first cloud storage represented by the first cloud unit (e.g., source cloud unit) to the second cloud storage represented by the second cloud unit (e.g., target cloud unit).

The updating of the metadata in the cloud tier of the backup system allows the backup system to track the second cloud unit as being the new location of the file. Thus, if the backup system receives a request from a client to recall the file, the backup system can review, consult, or examine the metadata to locate the file's new location (e.g., second cloud unit) and then recall the file from the second cloud unit to the active tier of the backup systems and to the requesting client. The backup system provides the customer with continuous data access. That is, the customer user can recall a file that was backed up to the backup system—regardless of whether the file currently resides outside of the backup system at a cloud storage (e.g., has been moved from the backup system to the cloud storage) and regardless of whether the file has been moved to a different cloud storage (e.g., moved from a first cloud storage to a second cloud storage).

Table C below shows an example of the updated metadata that may be stored in the cloud tier of the backup system.

TABLE C

| Filename | Cloud Location | Cloud Account Detail | Placement Time | File (e.g., object) ID |
|---|---|---|---|---|
| File 2 | Cloud Unit 2 ID | Cloud Unit 2 username/password | Feb. 3, 2020 | 8675309 |
| . . . | . . . | . . . | . . . | . . . |

Table C is similar to table B. In table C, however, the metadata is associated with the second cloud unit. For example, the cloud location column indicates that file 2 now resides at cloud unit 2. The cloud account detail column stores the user's cloud account credentials for the second cloud. The placement time column stores the timestamp indicating when file 2 was placed into the second cloud. The file ID column stores the object ID returned to the backup system by the second cloud upon file 2 being placed into the second cloud.

As discussed, there can be any number of reasons a customer organization may wish to change cloud services providers. For example, an organization decision may have been made to change the service provider due to changes in the terms and conditions, contract renewal, cost-benefits, compliance standards, data consolidation, or other reason. As another example, the cloud service provider may have announced an end-of-service. The systems and techniques described herein allow customers to perform data management operations, such as data migration between multiple cloud service providers, with the backup system being aware of the migration, but without having to recall the data from a cloud service provider to the backup system and then retransmit the data to a new cloud service provider. Since the backup system is aware of the migration, the backup system is able to locate the backed up data now residing at the new cloud storage location.

Figure 5:
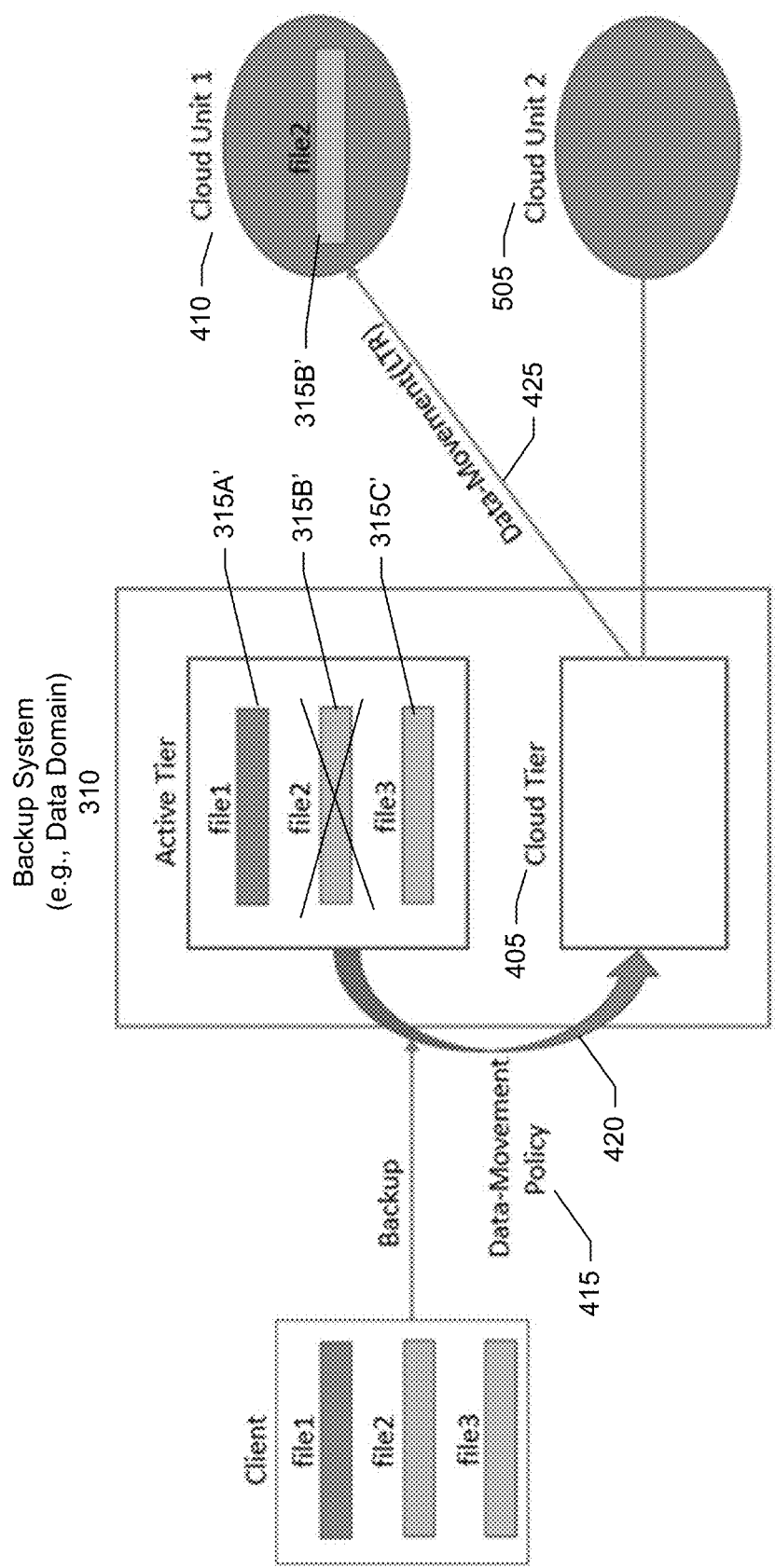
FIG. 5 shows a block diagram of establishing a second cloud unit representing a second cloud storage, according to one or more embodiments.

FIG. 5 shows a block diagram for adding a second cloud storage. The block diagram shown in FIG. 5 is similar to the block diagram shown in FIG. 4. In FIG. 5, however, a second cloud provider having second cloud storage has been added to the backup system (e.g., Data Domain) and a second cloud unit 505 representing the second cloud storage has been configured. In other words, using an interface of the backup system, an end user can add or connect the second cloud unit to the backup system to perform data management operations.

Figure 6:
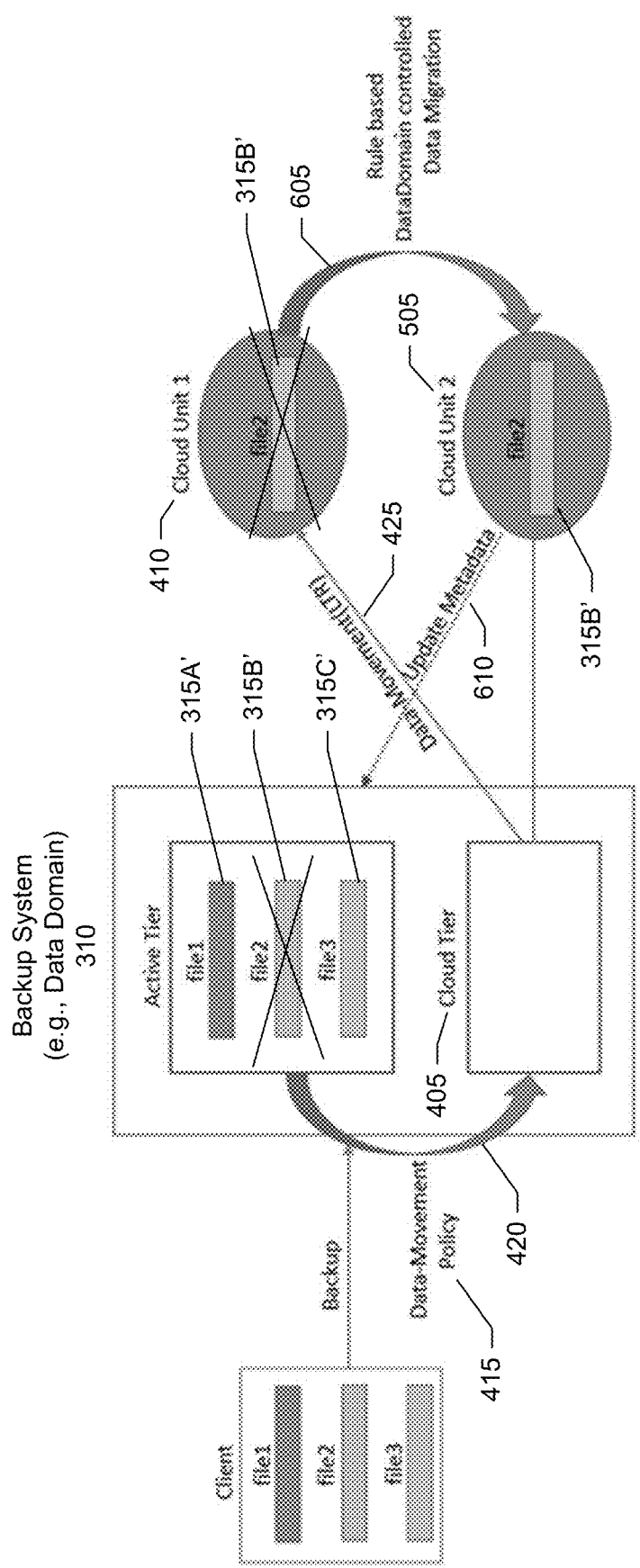
FIG. 6 shows a block diagram of migrating the file from the first cloud unit representing the first cloud storage to the second cloud unit representing the second cloud storage, according to one or more embodiments.

FIG. 6 shows a block diagram for performing a data management operation between cloud units. In a specific embodiment, the data management operation is performed on-demand and initiated from within the backup system. In another specific embodiment, there is a rule-based backup system controlled data management operation.

There can be three types of data management operations available between multiple clouds to serve different use cases. A first type of data management operation is a move/migrate. In the move/migrate data management operation, data from the source cloud unit is moved (deleted) and placed on the target cloud unit. A second type of data management operation is a copy. The copy operation copies data from the source cloud to target cloud. A third type of data management operation is the sync operation where the source cloud is synced to the target cloud, changing the target only.

In a specific embodiment, the backup system provides for creating a rule to perform any of the above-mentioned data-management operations between cloud units. In this specific embodiment, the backup system includes a data management engine which performs the requested operations (e.g., copy, move, or sync) as specified in the rule by end user. To perform the data management operations, a tool may be embedded into the data management engine in the backup system, so that the data management operation (e.g., copy, move, or sync) can be triggered directly from the backup system. The tool can use APIs provided by the cloud service providers and may be native to the backup system. Alternatively, a wrapper may be written on top of an open source tool to integrate the tool into the backup system.

The block diagram shown in FIG. 6 is similar to the block diagram shown in FIG. 5. In FIG. 6, however, a rule-based backup system controlled data migration has been triggered which results in a moving 605 of file 315B" from the first cloud unit to the second cloud unit. The backup system orchestrates the operation. The backup system, upon receiving 610 a verification from the second cloud unit that the operation was completed successfully, updates the metadata stored in the cloud tier to indicate that file 315B" now resides at the second cloud storage represented by the second cloud unit. In FIG. 6, an "X" has been superimposed over file 315B" in the first cloud unit to indicate that the file has been migrated from the first cloud unit to the second cloud unit.

In a specific embodiment, a method includes storing first credentials for accessing a first cloud account belonging to an organization and provided by a first cloud provider; storing second credentials for accessing a second cloud account belonging to the organization and provided by a second cloud provider, different from the first cloud provider; backing up a file of the organization from a client to a backup server managed by the organization; accessing the first cloud account using the first credentials; moving the file backed up to the backup server from the backup server to first cloud storage associated with the first cloud account and provided by the first cloud provider; receiving an indication from the first cloud provider that the file was successfully received; storing, at the backup server, metadata tracking movement of the file from the backup server to the first cloud provider; accessing the second cloud account using the second credentials; directing moving of the file from the first cloud storage to second cloud storage associated with the second cloud account and provided by the second cloud provider without recalling the file from the first cloud storage to the backup server; receiving an indication from the second cloud provider that the file was successfully received; updating the metadata to indicate that the file now resides with the second cloud provider; receiving, at the backup server, a request to recall the file; reviewing the metadata to locate the file; and recalling the file from the second cloud storage to the backup server.

FIGS. 7-10 show screen shots of a management console of the backup system, according to one or more embodiments. The management console may be accessed via a web browser. In this specific embodiment, aspects for backup system aware direct data migration between clouds are implemented in a backup system known as Data Domain by Dell EMC and the management console is referred to as the Data Domain System Manager (DDSM).

Figure 7:
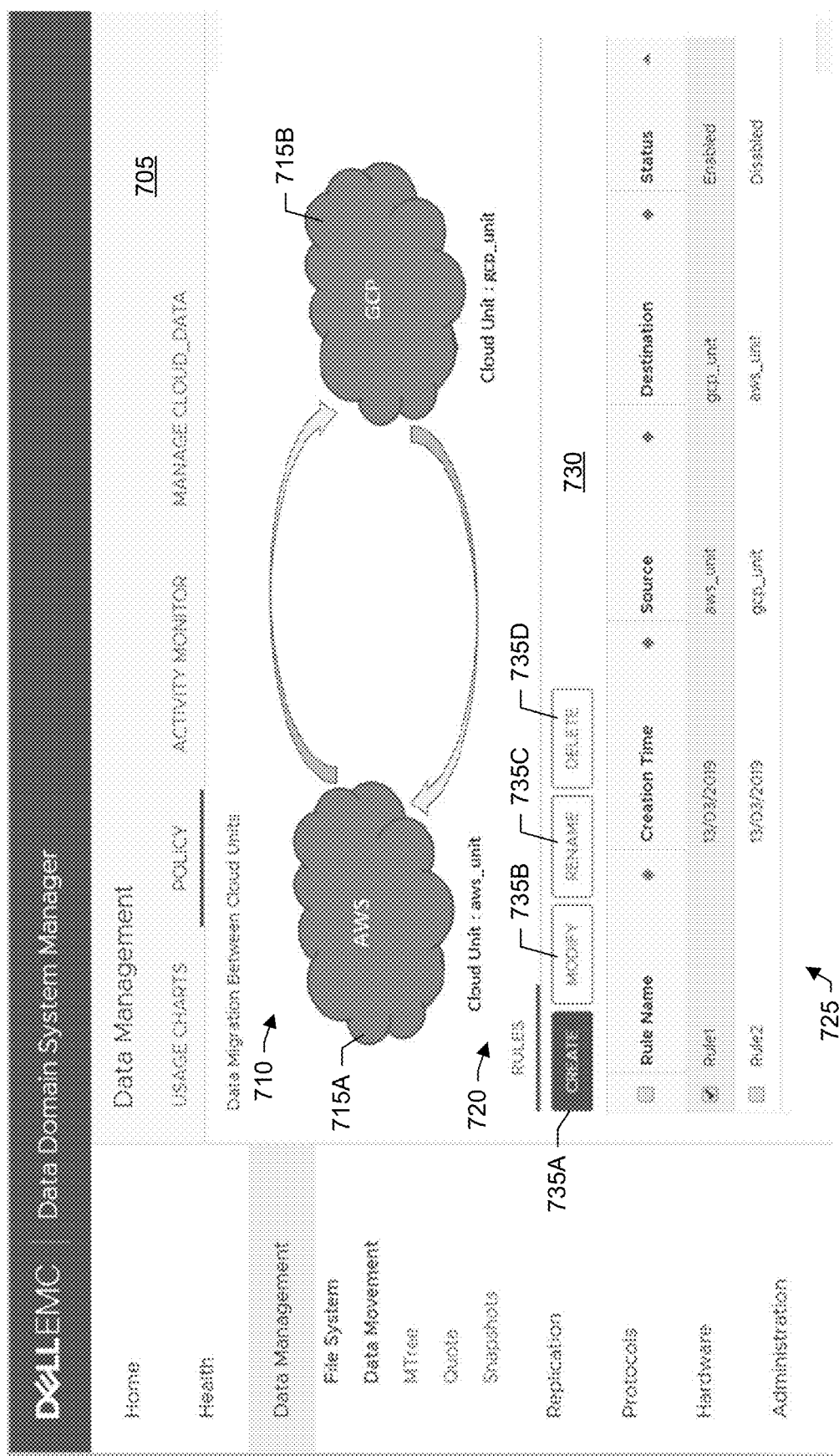
FIG. 7 shows a screenshot of a data management graphical user interface (GUI), according to one or more embodiments.

FIG. 7 shows a summary page 705 of rules for data migration between cloud units. The page includes a graphic 710 showing first and second cloud units 715A,B that have been configured and added to the backup system (e.g., AWS cloud unit and Google Cloud unit). The graphic allows users to visualize the lifecycle and movement of a backed up file. A rules table 720 lists data management rules 725 that have been created. A first column of the rules table includes checkboxes for selecting a rule. A second column of the rules table lists a rule name. A third column of the rules table lists a creation date of the rule. A fourth column of the rules table lists the source cloud unit. A fifth column of the rules table lists the destination (or target) cloud unit. A sixth column of the rules table lists a status of the rule (e.g., enabled or disabled).

A toolbar bar 730 above the rules table includes options for creating a rule 735A, deleting a rule 735B, renaming a rule 735C, and deleting a rule 735D. For example, to create a new rule, the user can use a pointing device (e.g., mouse) to click the create button.

FIG. 8 shows an example of a first page 805 for creating a cloud data management rule. This page allows users to create a data management rule to manage data between two cloud units controlled by the backup system. To create a rule, the user inputs a name 810 for the rule; selects 815 whether the rule should be inclusive (e.g., include in the data management operation data that matches conditions specified for the rule) or exclusive (e.g., exclude data from the data management operation that matches conditions specified for the rule); identifies 820 the source and target cloud units; selects 825 the data management operation to be performed, e.g., copy (copies data from source cloud unit to target cloud unit), move (data from the source cloud unit will be moved (deleted) and placed on the target cloud unit), or sync (source cloud unit is synced to target cloud unit, changing target cloud unit only); and sets 830 notification options. The user can click a next button 835 to save the settings and advance to a second page to define selection criteria.

Figure 9:
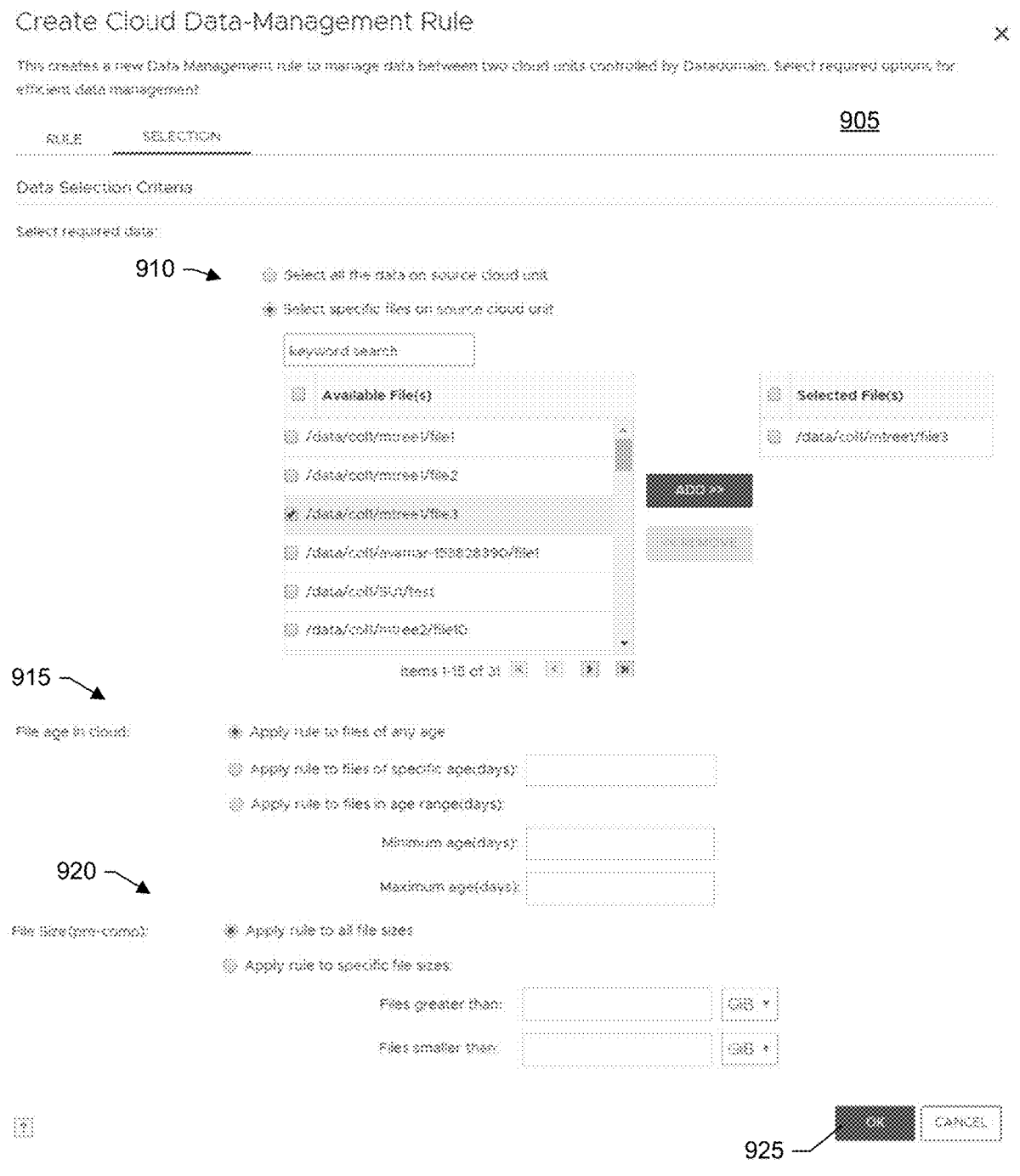

FIG. 9 shows an example of a second page 905 for creating the cloud data management rule. This page allows the user to define the data selection criteria subject to the data management operation. Radio buttons 910 allow the user to specify that all data on the source cloud unit is subject to the data management operation or specify specific files or directories on the source cloud unit subject to the data management operation. The page further allows the user to specify aging conditions 915 and file size conditions 920 to which the rule should apply. This allows for very granular control over the data subject to the data management operation. For example, the user can choose to apply the rule to files of any age, files of a specific age, or files falling within a particular age range; apply the rule to all file sizes; apply the rule to files falling within a particular size range; or combinations of these. The user can then save the rule by clicking an "OK" button 925. This rule-based data-management solution provides several options during rule creation. These options help to perform optimized and efficient data management operations.

Figure 10:
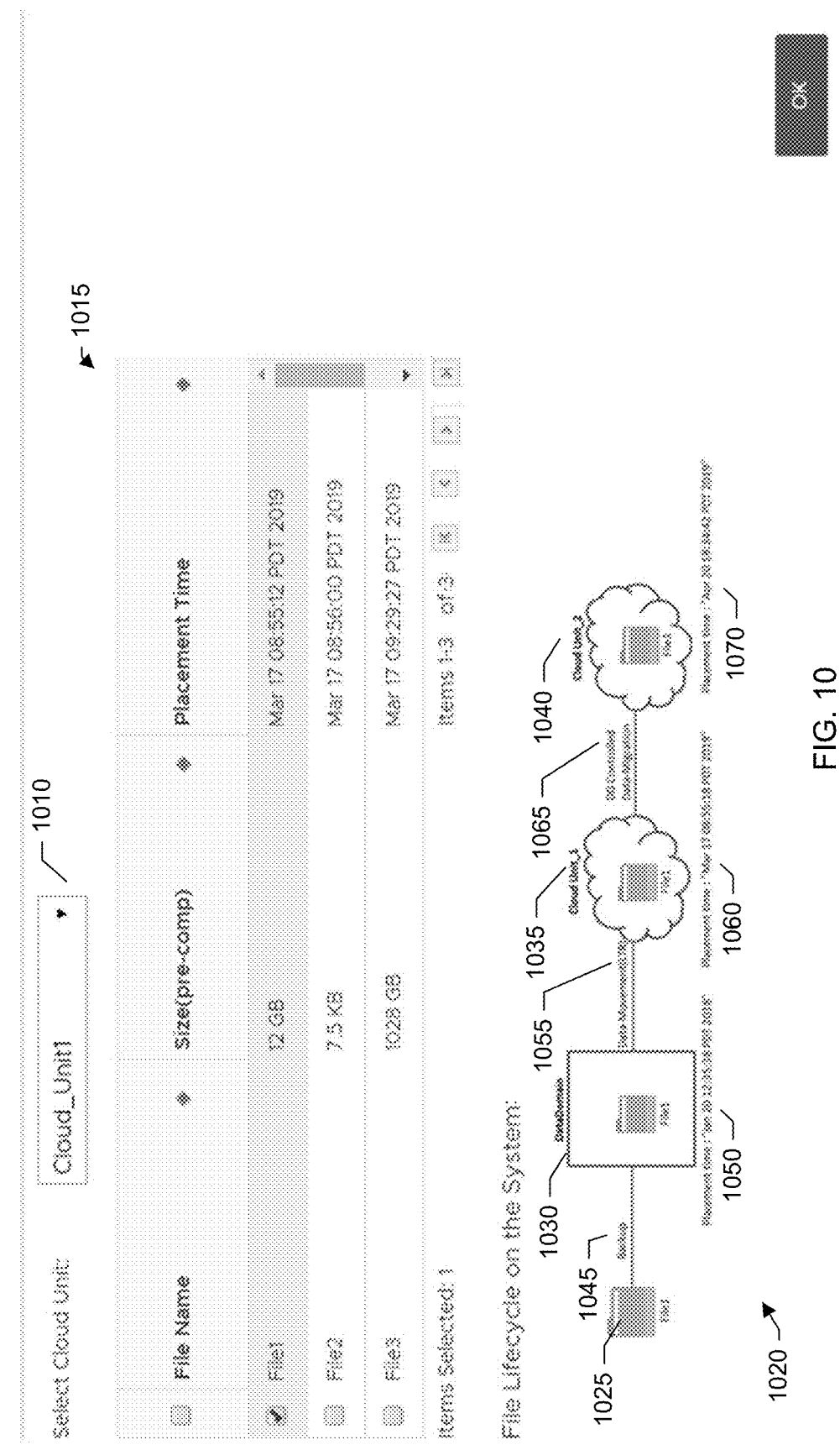
FIG. 10 shows a screenshot of a cloud explorer, according to one or more embodiments.

FIG. 10 shows a page 1005 for displaying a lifecycle of a file. This page may be referred to as the cloud explorer. The cloud explorer allows for accessing and searching files from all clouds using a single interface. In other words, the cloud explorer provides for management of all clouds in one place which eases management for customers. Customer users can access and manage files on all clouds at a single location called "Cloud Explorer."

As shown in the example of FIG. 10, a dropdown control 1010 allows the user to select a cloud unit. A table 1015 lists the files available at the selected cloud unit. A first column of the table includes checkboxes to allow the user to select a file and view lifecycle information. A second column of the table lists a name of the file. A third column of the table lists a size of the file. A fourth column of the table lists a placement time (e.g., time and date that file was placed or put at the selected cloud unit).

A graphic 1020 displays lifecycle information for the selected file. As shown in the example of FIG. 10, there is a first icon 1025 representing the selected file, a second icon 1030 representing a backup system (e.g., Data Domain), a third icon 1035 representing a first cloud unit, and a fourth icon 1040 representing a second cloud unit.

A graphical line 1045 between the first and second icons indicates a backup of the file from a client to the backup system. A timestamp 1050 indicates a time and date that the file was backed up to the backup system.

A graphical line 1055 between the second and third icons indicates a data movement operation of the file from the backup system to the first cloud unit for long term retention (LTR). A timestamp 1060 indicates a time and date that the file was moved or placed at the first cloud unit.

A graphical line 1065 between the third and fourth icons indicates a backup system controlled data migration of the file from the first cloud unit to the second cloud unit. A timestamp 1070 indicates a time and date that the files was migrated from the first cloud unit and placed at the second cloud unit.

The tracking information for the file is maintained as metadata in the cloud tier of the backup system. Even though the migration of the file from the first cloud unit to the second cloud unit is performed outside of the backup system and without recalling the file to the backup system, the backup system is still able to track the file because the backup system orchestrates or controls the migration.

For example, upon a determination that the file is to be migrated from the first cloud unit to the second cloud unit, the backup system (e.g., data management engine of the backup system) establishes connections to the first and second cloud units. The backup system further orchestrates a connection between the first and second cloud units. The backup system issues a request to the first cloud unit to move the file to the second cloud unit. The backup system tracks the cloud unit responses to the request (including confirmation of the file being received at the second cloud unit) and stores the information as metadata in the cloud tier of the backup system.

The backup system may store a checksum or other signature of the file. The checksum allows the backup system to verify that the file has been properly migrated between cloud units. For example, when the backup system receives a response from the second cloud unit that the file has been received at the second cloud unit, the backup system may issue a request to the second cloud unit for a calculation of the checksum of the file. The backup system, upon receipt of the checksum from the second cloud unit, can compare the received checksum against the corresponding checksum for the file stored in the metadata of the cloud tier. Matching checksums can indicate that the file was successfully migrated from the first cloud unit to the second cloud unit. Non-matching checksums can indicate that there was a problem with the migration. The backup system may then generate an alert or other notification to the backup administrator user so that the problem can be investigated.

The backup system can further track not only the amount of backup data stored at the backup system (e.g., files backed up to the active tier of the backup system), but also the amount of data stored outside of the backup system and at the different cloud storages.

Below are some benefits of the backup system aware direct data migration between clouds.

1) Full control of data-management operations to backup system and direct data transfer between cloud providers.

2) Leveraging of deduplication engine of the backup system to send only unique data across the network and protecting more data in the cloud. This is done in a much smaller footprint which leads to lower bandwidth and cloud storage costs.

3) Allows for restores by the backup system of files that may have been placed at the second cloud provider.

4) Addresses security concerns during data migrations.

5) Facilitates "complete integrated solutions" with an ease of use for managing data and its lifecycle.

Systems and techniques of the backup system aware direct data migration between clouds allows for moving data from one cloud vendor to another cloud vendor without recalling the data to the backup system. Depending upon the amount of data to migrate and available network bandwidth, a direct migration can save weeks, months, or even a year's time that may be involved in a recall operation. Further, recall operations can be costly as they may be billed by the cloud service provider.

In a specific embodiment, since migration is controlled by the backup system, there is no need to rely on cloud vendor native tools to migrate data between multiple clouds (which may involve downloading and uploading the data which leads to security concerns, loss of encryption, loss of deduplication, and lengthy migration durations especially when large datasets are involved).

Since migration is controlled by the backup system, rather than a third party tool, the backup system can track the movement of backed up files across different cloud providers and thus recall the data from a particular cloud vendor (e.g., second cloud vendor) even if the data had originally been moved from the backup system to a different cloud vendor (e.g., first cloud vendor).

Figure 11:
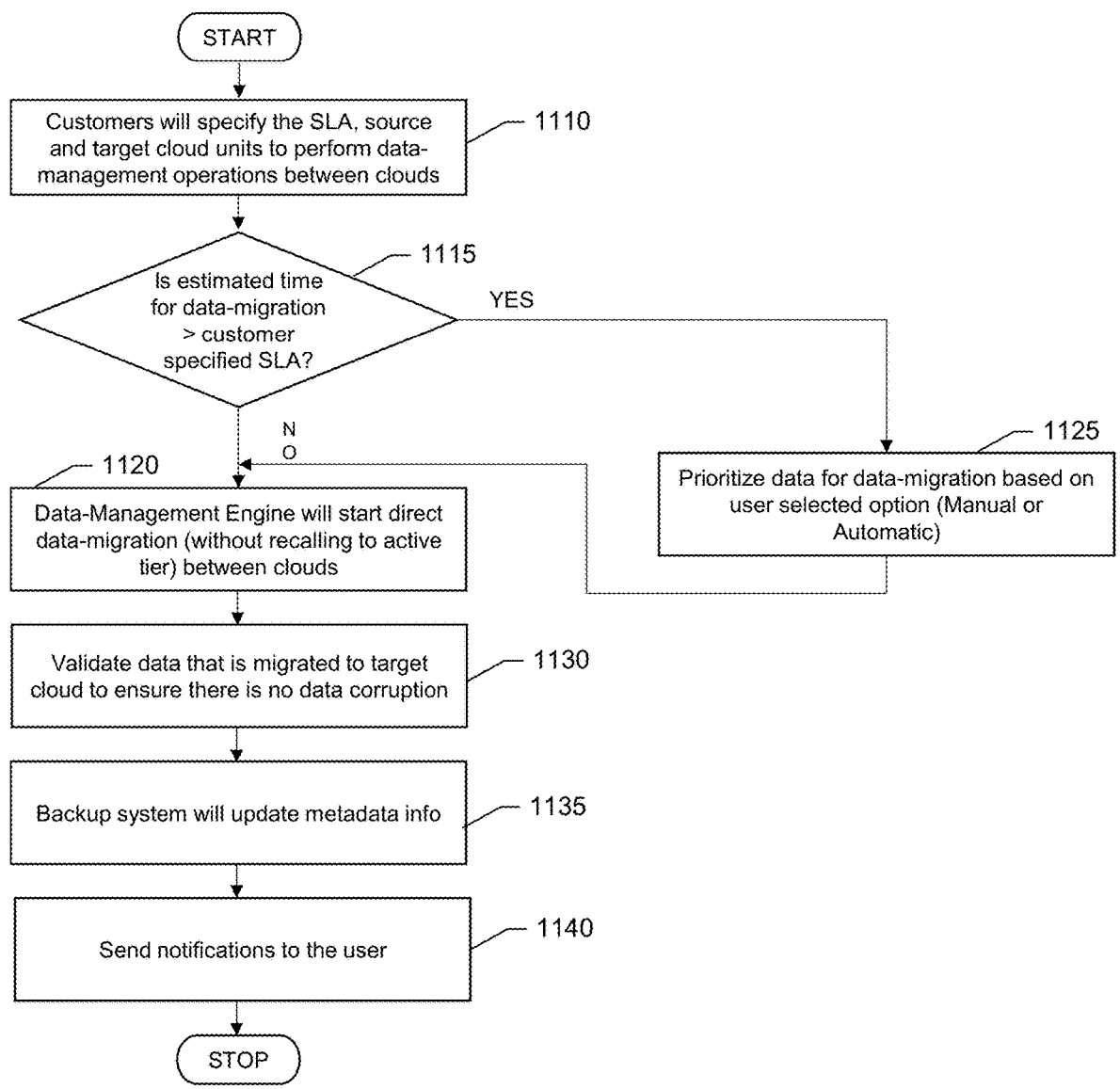
FIG. 11 shows a flow diagram for prioritizing data subject to migration, according to one or more embodiments.

FIG. 11 shows a flow for prioritizing data subject to data management operations between first and second cloud units. In a step 1110, a customer user can specify a service level agreement (SLA), source and target cloud units for the data management operations between the clouds, and, more specifically, specify an allotted threshold duration for the data management operations.

In a step 1115, the backup system estimates a time for the data management operation and determines whether the estimated time is greater than the allotted threshold duration specified in the SLA. For example, upon determining that the data management operation should be performed, the backup system may calculate a network speed between the first and second clouds. Network speed may be determined by pinging the first and second clouds. In a specific embodiment, the backup system may direct a ping request from the first cloud to the second cloud. The ping response times provide an indication of the network speed and, based on the size of the data involved in the data management operation, the backup system can estimate an amount of time to complete the data management operation.

The backup system consults the SLA to determine whether the estimated time exceeds the allotted threshold duration. If the estimated time does not exceed the allotted threshold duration, the backup system proceeds with the data management operation (step 1120). That is, the data management engine of the backup system initiates or starts the direct data migration between the clouds (without recalling to the active tier of the backup system).

Alternatively, if the estimated time exceeds the allotted threshold duration, the data subject to the data migration is prioritized (step 1125). The user may be notified of the estimated time exceeding the allotted threshold duration and may be prompted to select a manual prioritization or an automatic prioritization.

If the user selects an option for manual prioritization, the user is further prompted to select a priority order according to which the files are to be migrated. Consider, as an example, that files A, B, C, and D are to be migrated. The user may define the priority order as file B, followed by file D, followed by file A, and finally file C. The backup system receives the priority order and will then proceed with the data management operation (step 1120) according to the priority order.

If, however, the user selects an option for automatic prioritization, the backup system automatically generates a priority order for the files. The priority order may be automatically generated based on one or more criteria including data access pattern, file size, data retention requirements, or other criteria, or combinations of these. For example, older files that were first moved to the first cloud from the backup system may be prioritized over newer files that were more recently moved to the first cloud from the backup system. Files involved in the data management operation may be unavailable during the operation. Thus, prioritizing the older files can help to reduce any disruption to the customer organization as older files may be less likely to be recalled as compared to the newer files. Once the priority order has been generated, the data management operation may then proceed (step 1120) according to the automatically generated priority order.

In a step 1130, upon completion of the data migration, the backup system validates that the data has been properly migrated from the first cloud to the second cloud to ensure that there is no data corruption. As discussed, the validation may be performed by maintaining checksums of the files as metadata at the cloud tier of the backup system and comparing the checksums against the checksums for the files once the files have been placed at the second cloud.

In a step 1135, the backup system updates the metadata information maintained at the cloud tier of the backup system. The metadata may include, for example, timestamps indicating when the files were placed or put at the second cloud. References, at the backup system, to the files may be updated to point to and identify the second cloud. This allows the backup system to locate the files at the second cloud if requested such as during a recall operation.

In a step 1140, the backup system sends notifications or status updates to the user.

Table D below shows an example of pseudo code of an algorithm for data management operations between clouds.

TABLE D

Figure 12:
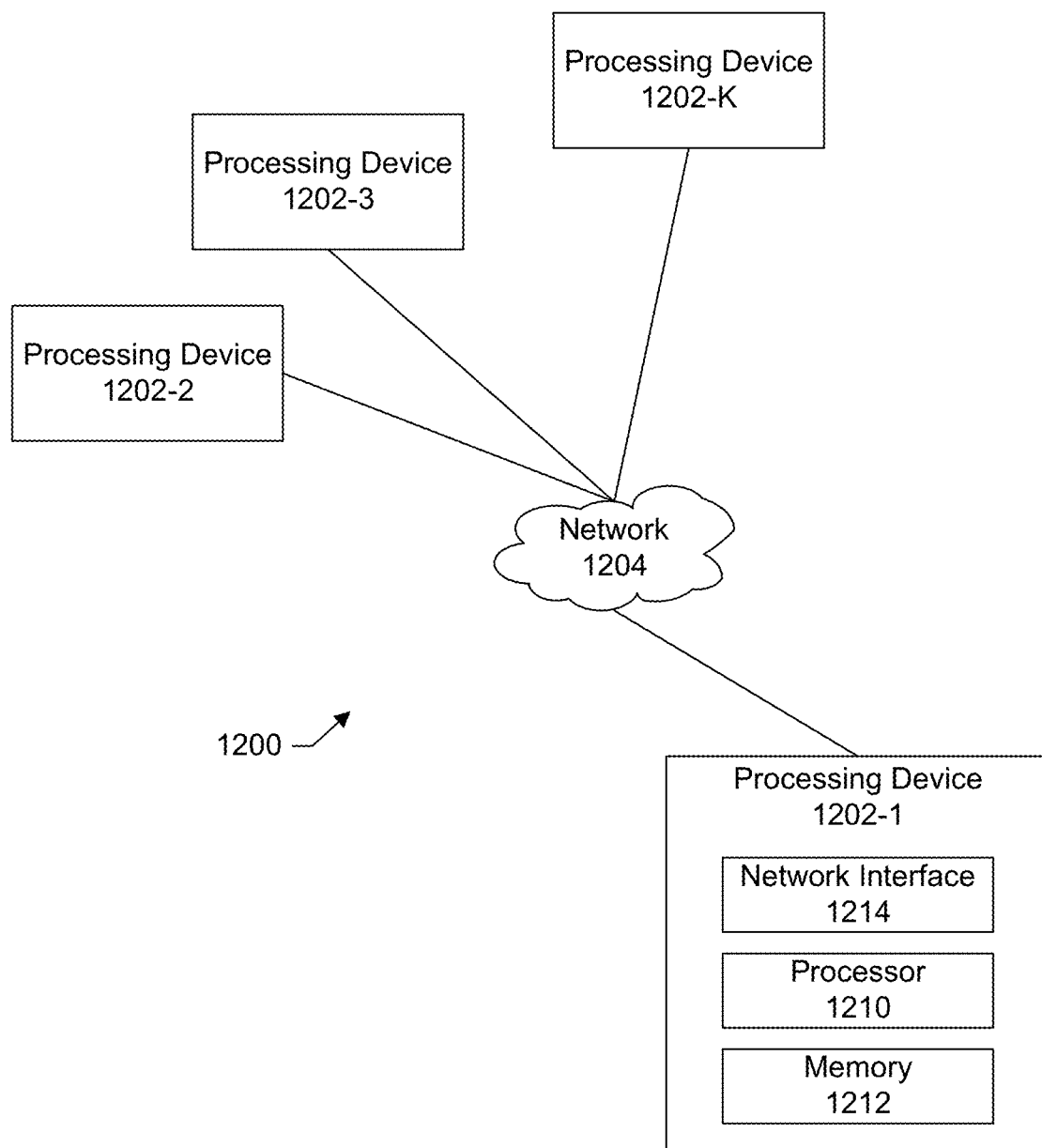
FIG. 12 shows another block diagram of a processing platform that may be utilized to implement at least a portion of an information processing system, according to one or more embodiments.

Initialize variable source_cloud = Name of the source cloud unit
Initialize variable target_cloud = Name of the target cloud unit
Initialize variable $t_p$ = Estimated time for data-migration (based on linear regression)
Initialize variable $t_c$ = Customer defined SLA
Initialize variable Option = User selected option to prioritize data for data-management operation
Initialize variable Operation = data-management operation to be performed
Initialize list rule = user created rules for different data-management operations
FOR every rule in rule:
  IF tp > tc:
    Since estimated time for data-migration exceeds the customer specified SLA, data will be prioritized for data-migration between clouds
    IF Option is Manual:
      End user needs to prioritize the data for choosing most critical data
      Data-Movement Engine will perform the data-migration between clouds
    Validate data on target cloud to ensure there is no data corruption
    Send notification to the user
  ELSEIF Option is Autonomous:
    Data-Management Engine will prioritize the data based on various conditions
    Data-Movement Engine will perform the data-migration between clouds
    Validate data on target cloud to ensure there is no data corruption
    Send notification to the user
  ELSE:
    Data-Movement Engine will start the required data-management operation between clouds
    Validate data on target cloud to ensure there is no data corruption
    Send notification to the user FIG. 12 shows an example of a processing platform 1200. The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 1200 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 13:
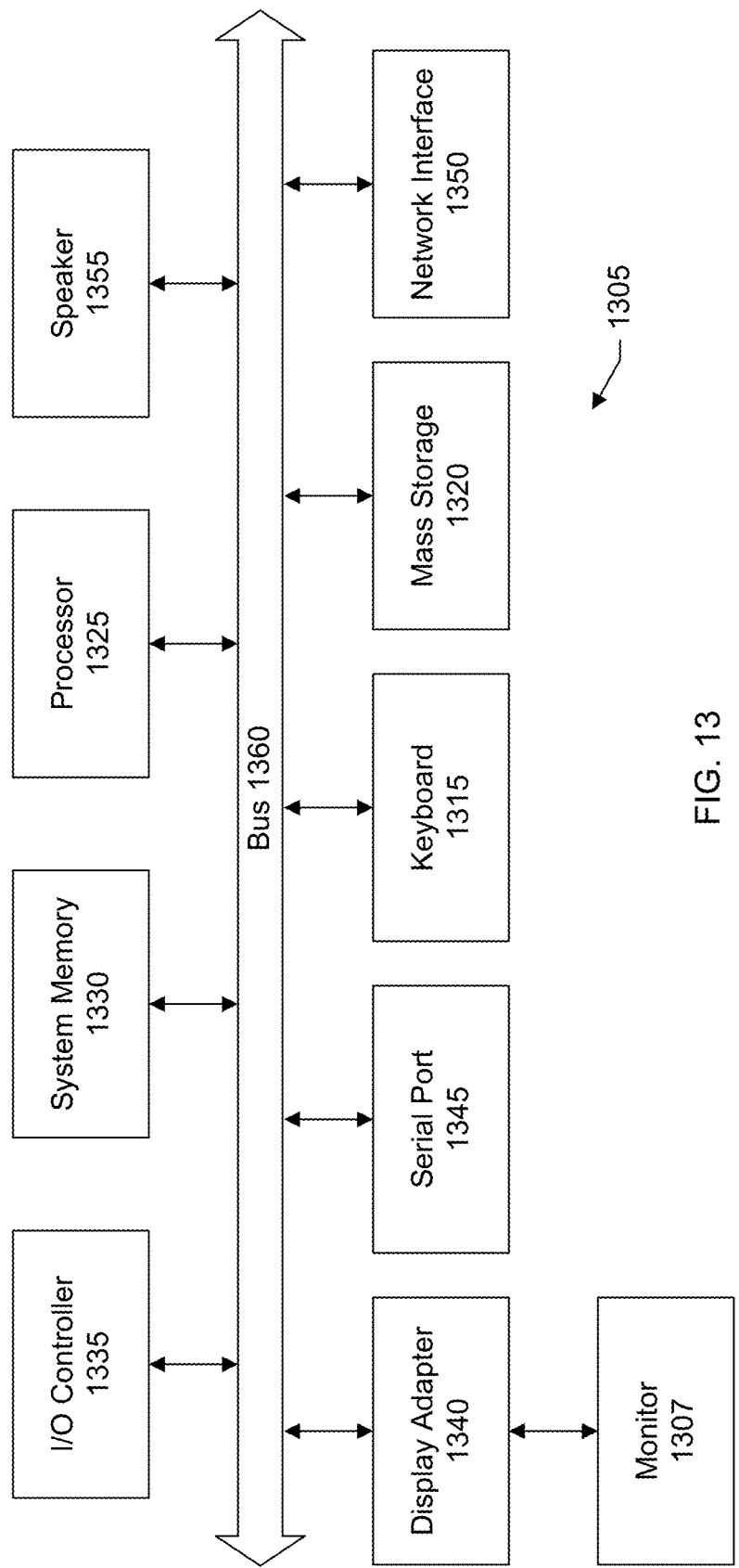
FIG. 13 shows a block diagram of a computer system suitable for use with the information processing system, according to one or more embodiments.

FIG. 13 shows a system block diagram of a computer system 1305 used to execute the software of the present system described herein. The computer system includes a monitor 1307, keyboard 1315, and mass storage devices 1320. Computer system 1305 further includes subsystems such as central processor 1325, system memory 1330, input/output (I/O) controller 1335, display adapter 1340, serial or universal serial bus (USB) port 1345, network interface 1350, and speaker 1355. The system may also be used with computer systems with additional or fewer subsystems. For example, a computer system could include more than one processor 1325 (i.e., a multiprocessor system) or a system may include a cache memory.

Arrows such as 1360 represent the system bus architecture of computer system 1305. However, these arrows are illustrative of any interconnection scheme serving to link the subsystems. For example, speaker 1355 could be connected to the other subsystems through a port or have an internal direct connection to central processor 1325. The processor may include multiple processors or a multicore processor, which may permit parallel processing of information. Computer system 1305 shown in FIG. 13 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes backing up, by a backup application, a plurality of files from a plurality of clients to an active tier of a backup server; connecting a first cloud storage provided by a first cloud storage provider to the backup application to allow moving at least a first file from the backup server to the first cloud storage; creating first and second metadata for the first file; replacing the first file in the active tier with the first metadata; storing the second metadata in a cloud tier of the backup server, separate from the active tier, the first metadata in the active tier comprising a reference to the second metadata in the cloud tier, and the second metadata in the cloud tier comprising a reference to the first file moved to the first cloud storage; connecting a second cloud storage, separate from the first cloud storage, to the backup application to allow copying the first file from the first cloud storage to the second cloud storage, without recalling the first file to the active tier; triggering, within the backup application, a data management operation comprising copying at least a portion of the first file from the first cloud storage to the second cloud storage; and upon the copying, updating, by the backup application, the second metadata in the cloud tier to reference the first file now residing at the second cloud storage.

The method may further include receiving a request from a client to restore the first file; examining the second metadata in the cloud tier to determine a location of the first file; determining from the examination that the first file is located at the second cloud storage; recalling the first file from the second cloud storage to the active tier to the client, thereby fulfilling the request; and updating metadata in the cloud tier with information indicating that the first file has been restored to the client from the second cloud storage.

The method may further include generating and storing first information indicating a time and date when the first file was backed up to the active tier of the backup server; generating and storing second information indicating a time and date when the first file was moved from the active tier to the first cloud storage; generating and storing third information indicating a time and date when the data management operation was performed on the first file; receiving a request to display a lifecycle of the first file; and displaying, on a graphical user interface (GUI) of an electronic screen, a graphic having the first, second, and third information.

The method may further include after the copying the at least portion of the first file from the first cloud storage to the second cloud storage, deleting the first file from the first cloud storage.

The method may further include after the copying the at least portion of the first file from the first cloud storage to the second cloud storage, maintaining the first file at the first cloud storage.

The method may further include defining a data management rule to control the triggering of the data management operation between the first and second cloud storages, wherein the data management rule comprises at least one user-defined condition of a plurality of user-defined conditions to satisfy, the plurality of user-defined conditions comprising a first condition associated with an age of a file, and a second condition associated with a size of the file.

The method may further include moving the plurality of files from the backup server to the first cloud storage; determining that the plurality of files should be moved from the first cloud storage to the second cloud storage; calculating an estimated time required to move the plurality of files from the first cloud storage to the second cloud storage; consulting a service level agreement (SLA) specifying an allotted threshold duration for moving the plurality of files from the first cloud storage to the second cloud storage to determine whether the estimated time exceeds the allotted threshold duration; if the estimated time does not exceed the allotted threshold duration, proceeding with moving the plurality of files from the first cloud storage to the second cloud storage; and if the estimated time exceeds the allotted threshold duration, creating a priority list indicating an order in which the plurality of files are to be moved from the first cloud storage to the second cloud storage, and proceeding with the moving the plurality of files from the first cloud storage to the second cloud storage according to the priority list.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
registering, by a backup application, a first cloud vendor;
moving at least a first file from a backup storage of the backup application to the first cloud vendor;
maintaining a reference at the backup storage to the first file residing at the first cloud vendor;
registering, by the backup application, a second cloud vendor;
directing, by the backup application, a migration of the first file from the first cloud vendor to the second cloud vendor, without recalling the first file to the backup storage;
updating the reference maintained at the backup storage to refer to the first file now residing at the second cloud vendor;
maintaining the updated reference at the backup storage;
before the moving the first file from the backup storage to the first cloud vendor, backing up, by the backup application, the first file from a client to an active tier at the backup storage;
establishing a cloud tier at the backup storage; and
upon the first file being moved from the backup storage to the first cloud vendor, creating first and second metadata,
wherein the first metadata is maintained in the active tier at the backup storage, and the second metadata is maintained in the cloud tier at the backup storage, the reference being the second metadata, and
wherein the first metadata in the active tier references the second metadata in the cloud tier.

2. The method of claim 1 further comprising:
tracking the migration of the first file from the first cloud vendor to the second cloud vendor;
receiving a request from a client to restore the first file;
examining the updated reference to determine a location of the first file;
determining from the examination that the first file is located at the second cloud vendor;
recalling the first file from the second cloud vendor to the backup storage to the client; and
updating tracking information to indicate that the first file has been restored to the client from the second cloud vendor.

3. The method of claim 1 further comprising:
generating and storing first information indicating a time and date when the first file was backed up from a client to the backup storage;
generating and storing second information indicating a time and date when the first file was moved from the backup storage to the first cloud vendor;
generating and storing third information indicating a time and date when the first file was migrated from the first cloud vendor to the second cloud vendor;
receiving a request to display a lifecycle of the first file; and
displaying, on a graphical user interface (GUI) of an electronic screen, a graphic having the first, second, and third information.

4. The method of claim 1 further comprising:
defining a plurality of rules to trigger the moving of the first file from the backup storage to the first cloud vendor, and the migration of the first file from the first cloud vendor to the second cloud vendor.

5. The method of claim 1 further comprising:
storing, by the backup application, first credentials for accessing the first cloud vendor; and
storing, by the backup application, second credentials for accessing the second cloud vendor.

6. A system comprising: a processor; and memory configured to store one or more sequences of instructions which, when executed by the processor, cause the processor to carry out the steps of:
registering, by a backup application, a first cloud vendor;
moving at least a first file from a backup storage of the backup application to the first cloud vendor;
maintaining a reference at the backup storage to the first file residing at the first cloud vendor;
registering, by the backup application, a second cloud vendor;
directing, by the backup application, a migration of the first file from the first cloud vendor to the second cloud vendor, without recalling the first file to the backup storage;
updating the reference maintained at the backup storage to refer to the first file now residing at the second cloud vendor;
maintaining the updated reference at the backup storage;
before the moving the first file from the backup storage to the first cloud vendor, backing up, by the backup application, the first file from a client to an active tier at the backup storage;
establishing a cloud tier at the backup storage; and upon the first file being moved from the backup storage to the first cloud vendor, creating first and second metadata,
wherein the first metadata is maintained in the active tier at the backup storage, and the second metadata is maintained in the cloud tier at the backup storage, the reference being the second metadata, and
wherein the first metadata in the active tier references the second metadata in the cloud tier.

7. The system of claim 6 wherein the processor further carries out the steps of:
tracking the migration of the first file from the first cloud vendor to the second cloud vendor;
receiving a request from a client to restore the first file;
examining the updated reference to determine a location of the first file;
determining from the examination that the first file is located at the second cloud vendor;
recalling the first file from the second cloud vendor to the backup storage to the client; and
updating tracking information to indicate that the first file has been restored to the client from the second cloud vendor.

8. The system of claim 6 wherein the processor further carries out the steps of:
generating and storing first information indicating a time and date when the first file was backed up from a client to the backup storage;
generating and storing second information indicating a time and date when the first file was moved from the backup storage to the first cloud vendor;
generating and storing third information indicating a time and date when the first file was migrated from the first cloud vendor to the second cloud vendor;
receiving a request to display a lifecycle of the first file; and
displaying, on a graphical user interface (GUI) of an electronic screen, a graphic having the first, second, and third information.

9. The system of claim 6 wherein the processor further carries out the steps of:
defining a plurality of rules to trigger the moving of the first file from the backup storage to the first cloud vendor, and the migration of the first file from the first cloud vendor to the second cloud vendor.

10. The system of claim 6 wherein the processor further carries out the steps of:
storing, by the backup application, first credentials for accessing the first cloud vendor; and
storing, by the backup application, second credentials for accessing the second cloud vendor.

11. A computer program product, comprising a non-transitory computer-readable medium having a computer-readable program code embodied therein, the computer-readable program code adapted to be executed by one or more processors to implement a method comprising:
registering, by a backup application, a first cloud vendor;
moving at least a first file from a backup storage of the backup application to the first cloud vendor;
maintaining a reference at the backup storage to the first file residing at the first cloud vendor;
registering, by the backup application, a second cloud vendor;
directing, by the backup application, a migration of the first file from the first cloud vendor to the second cloud vendor, without recalling the first file to the backup storage;
updating the reference maintained at the backup storage to refer to the first file now residing at the second cloud vendor;
maintaining the updated reference at the backup storage;
generating and storing first information indicating a time and date when the first file was backed up from a client to the backup storage;
generating and storing second information indicating a time and date when the first file was moved from the backup storage to the first cloud vendor;
generating and storing third information indicating a time and date when the first file was migrated from the first cloud vendor to the second cloud vendor;
receiving a request to display a lifecycle of the first file; and
displaying, on a graphical user interface (GUI) of an electronic screen, a graphic having the first, second, and third information.

12. The computer program product of claim 11 wherein the method further comprises:
tracking the migration of the first file from the first cloud vendor to the second cloud vendor;
receiving a request from a client to restore the first file;
examining the updated reference to determine a location of the first file;
determining from the examination that the first file is located at the second cloud vendor;
recalling the first file from the second cloud vendor to the backup storage to the client; and
updating tracking information to indicate that the first file has been restored to the client from the second cloud vendor.

13. The computer program product of claim 11 wherein the method further comprises:
before the moving the first file from the backup storage to the first cloud vendor, backing up, by the backup application, the first file from a client to an active tier at the backup storage;
establishing a cloud tier at the backup storage; and
upon the first file being moved from the backup storage to the first cloud vendor, creating first and second metadata,
wherein the first metadata is maintained in the active tier at the backup storage, and the second metadata is maintained in the cloud tier at the backup storage, the reference being the second metadata, and
wherein the first metadata in the active tier references the second metadata in the cloud tier.

14. The computer program product of claim 11 wherein the method further comprises:
defining a plurality of rules to trigger the moving of the first file from the backup storage to the first cloud vendor, and the migration of the first file from the first cloud vendor to the second cloud vendor.

15. The computer program product of claim 11 wherein the method further comprises:
storing, by the backup application, first credentials for accessing the first cloud vendor; and
storing, by the backup application, second credentials for accessing the second cloud vendor.

* * * * *